United States Patent [19]

Cauquelin et al.

[11] Patent Number: 4,842,815
[45] Date of Patent: Jun. 27, 1989

[54] DEVICE FOR LOCKING A GUIDE RING ON A PLATE HAVING AN ORIFICE AND ITS USE FOR A GUIDE TUBE OF A NUCLEAR REACTOR

[75] Inventors: Claude Cauquelin, Neauphle le Chateau; Pierre Poitrenaud, Elancourt, both of France

[73] Assignee: Framatome, Courbevoie, France

[21] Appl. No.: 870,579

[22] Filed: Jun. 4, 1986

[30] Foreign Application Priority Data

Oct. 1, 1985 [FR] France ................................ 85 14542

[51] Int. Cl.$^4$ ............................. G21C 1/01; F41D 1/00
[52] U.S. Cl. ..................................... 376/463; 376/353; 285/360; 403/325; 403/348
[58] Field of Search ................ 376/353, 463; 285/360, 285/361, 395, 396, 401, 402, 158, 376; 403/348, 349, 325, 327, 343; 411/378, 910, 375

[56] References Cited

U.S. PATENT DOCUMENTS

| | | | |
|---|---|---|---|
| 1,677,607 | 7/1928 | Wood | 411/375 |
| 3,079,178 | 2/1963 | Simpkins | 285/360 X |
| 3,100,655 | 8/1963 | Work | 285/401 X |
| 3,116,942 | 1/1964 | Morello, Jr. | 285/401 X |
| 3,201,151 | 8/1965 | Westveer | 285/361 X |
| 4,281,895 | 8/1981 | Mohr | 285/401 X |
| 4,637,914 | 1/1987 | Boyle et al. | 376/353 |

Primary Examiner—John S. Maples
Attorney, Agent, or Firm—Pollock, Vande Sande & Priddy

[57] ABSTRACT

Device for locking a guide ring on a plate having an orifice comprising a tubular intermediate piece (22) fastened rigidly to a plate (20) so that its central orifice (36) is coaxial with the orifice (32) in the plate (20), receptacles (28) machined radially in the intermediate piece (22) and separated by passages open towards one end of the intermediate piece, and attachment parts (39) which match the receptacles (28) of the intermediate piece (22) and which are associated with the guide ring (21). The invention is used particularly for locking the guide ring of an extension piece on a guide tube of a light-water nuclear reactor.

10 Claims, 5 Drawing Sheets

DEVICE FOR LOCKING A GUIDE RING ON A PLATE HAVING AN ORIFICE AND ITS USE FOR A GUIDE TUBE OF A NUCLEAR REACTOR

FIELD OF THE INVENTION

The present invention relates to a locking device which allows the rapid installation and extraction of a removable ring and which can be used more particularly on the guide tubes of nuclear reactors.

BACKGROUND OF THE INVENTION

In nuclear reactors having power and shutdown control rods, it is known to use guide tubes not only for guiding the rods themselves in the form of a bundle, but also for guiding the shaft connecting the bundle to the mechanism controlling the translation of the rods. This shaft, called an extension piece, is centered and guided in a tube arranged in the space located between the guide tubes of the bundle and the wall of the containment carrying the mechanisms.

Arranged in a conventional manner at the end part of the tube is a ring which ensures the guidance of the extension piece and acts as a flow limiter to force the coolant, which has passed through the core and penetrated into the guide tubes, to flow off through the orifices provided for this purpose in the guide tubes of the bundles.

Moreover, during the operations of unloading and reloading the core, this ring allows the extension piece to be guided laterally, so that, when the cover of the vessel is lowered, this extension piece can penetrate into perforations made in the cover.

Finally, it must be possible to remove this ring so that the conventional maintenance operations can be carried out on the components of the nuclear-reactor cores.

For this purpose, this ring is retained on the end plate of the tube by means of flexible elements. These flexible elements are integral with the end plate and are distributed circumferentially round the orifice made in the center of the said plate. The end part of the flexible elements which is opposite that connected to the plate has an extra thickness intended for bearing on the peripheral edge of the ring, when the latter is arranged in the orifice, thus ensuring that it is retained.

Consequently, a constant mechanical tension is generated in the flexible elements. Because of the atmosphere prevailing in the core of the reactor during its operation, this assists the development of stress corrosion and the risks of cracking of the flexible elements. These risks of cracking are all the more harmful because they can cause fractures of the flexible elements. The immediate results of these fractures are that the rings lose their retention and objects migrating in the primary circuit of the nuclear reactor are produced.

In an embodiment known from European Patent Application 0,133,173, the guide ring is automatically snapped into the orifice in the end plate by means of retractable attachment elements which are carried by the ring and which are held in the locking position by means of spring devices.

Although these removable systems are convenient to install and function very safely, it is still just as likely that, as a result of stress corrosion phenomena, there will be risks of fracture, causing migrating bodies to be produced.

Furthermore, these systems require relatively complex tools to fit them and remove them, because these operations are carried out under a considerable depth of water necessary to protect the operators.

SUMMARY OF THE INVENTION

The object of the present invention is to overcome the disadvantages of the prior art and provide a locking device which makes it possible to fit and remove a guide ring by means of a simplified tool.

To achieve this object, the present invention provides a device for locking a guide ring on a plate having an orifice, which device comprises:
  a tubular intermediate piece fastened rigidly to the plate, so that its central orifice is coaxial with the orifice of the plate,
  receptacles machined radially in the intermediate piece, arranged on its inner periphery and separated by passages open towards an axial end of the intermediate piece,
  attachment parts matching the receptacles of the intermediate piece and associated with the guide ring on its outer periphery.

The invention also relates to a guide ring having a set of lugs spaced from one another and distributed over its periphery, thus defining members designed to be introduced into the orifices of the piece fastened rigidly to the said plate, and intended to ensure the locking of the ring, after the latter has been rotated through a given angle, as a result of the blocking of the said lugs in the said receptacles of the said piece.

Finally, the invention relates to the means of positioning accurately and blocking the ring on the intermediate piece.

In a preferred embodiment of the invention, the plate is an end plate of a guide tube of an extension piece of a control rod of a light-water nuclear reactor, the intermediate piece is centered and permanently fastened on the end plate during a maintenance operation, and the said guide ring ensures the guidance of the extension piece and the limitations of the flow of light water in the guide tube, and this guide ring can be separated from the intermediate piece simply by being rotated during a subsequent maintenance operation.

BRIEF DESCRIPTION OF THE DRAWINGS

In order that the invention may be more clearly understood, several embodiments of the device for locking a removable guide ring for a guide tube of a pressurized-water nuclear reactor will now be described, by way of example, with reference to the attached Figures.

DESCRIPTION OF PREFERRED EMBODIMENTS

Figure 1:
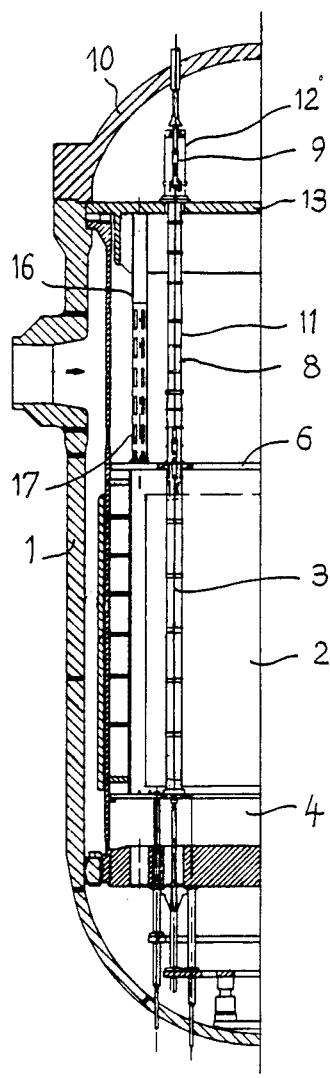
FIG. 1 shows in section a partial view of the vessel and the internal equipment of a nuclear reactor.

FIG. 1 shows the vessel of a pressurized-water nuclear reactor, inside which is arranged the reactor core 2 consisting of a set of fuel assemblies 3 arranged vertically and resting on the lower core plate 4 by means of their lower end piece.

Located above the core 2 is the upper core plate 6 which is perforated with orifices in line with each of the fuel assemblies and on which rest the guide tubes 8 arranged vertically above some of the core assemblies.

Above the hemispherical cover 10 of the vessel are mechanisms (not shown) for displacing the control rods, in the form of a bundle, which are connected to the lower end of control spindles 9, on which the action of the mechanisms is exerted.

The control rods can move within the fuel assemblies 3, inside tubes which replace some of the fuel rods in this network of fuel assemblies, so as to monitor the reactivity of the core 2.

Figure 2:
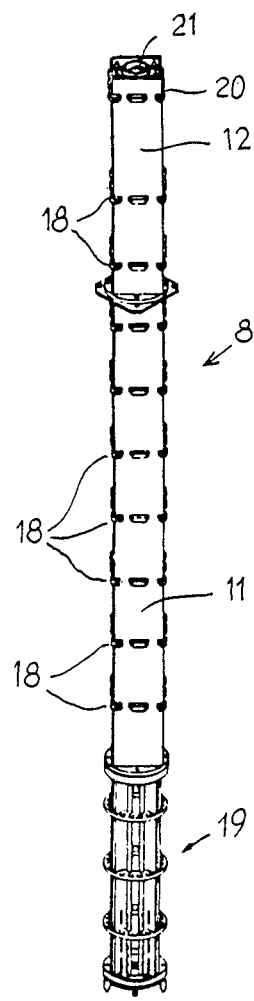
FIG. 2 shows a guide unit for a control rod and for its extension piece.

As can be seen in more detail in FIG. 2, the guide tubes 8 are composed of a lower part 11, called a guide tube hereinafter, resting on the support plate 13 and guided in the upper core plate 6, and an upper part 12, called a tube hereinafter, connected to the support plate 13 parallel to the plate 6.

The plates 6 and 13 are connected to one another by means of tubular struts 16 perforated with orifices 17 for the circulation of the cooling fluid consisting of pressurized light water filling the vessel. By means of these struts 16, the upper internal equipment forms a rigid assembly integral with the support plate 13.

Arranged inside each of the guide tubes 8 and over their entire upper part are discontinuous guidance devices consisting of perforated plates 18 spaced uniformly from one another over the length of the guide tube 11 and in the lower part of the tube 12.

The lower part 19 of the guide tube 11 forms a continuous guidance device for the control rods, its perforations being in the extension of the perforations of the discondtinuous devices 18.

The part 19 of the guide tube consists of sleeves occupying the entire height of the zone 19 and having vertical channels guiding the control rod.

This zone 19 without a tubular casing thus allows most of the cooling fluid which has passed through the adjacent fuel assemblies 3 to mix with the portion of cooling fluid circulating via the orifices 17, so as to be directed towards a steam generator (not shown).

If the zone 19 has a tubular casing, it is obvious that lateral orifices will be made in this region, to allow the cooling fluid to be discharged.

The control rods consist of a bundle of absorbent fuel rods connected, in their upper part, by means of a crossbrace or spider support, itself connected to the lower part of the control spindles or extension piece 9.

A plate 20 having a ring 21 is arranged in the upper part of the tube 12. As explained above, it must be possible to remove this ring 21, to make it possible, during maintenance operations on the equipment, to pass through the end part of the extension piece 9 which has a larger cross-section at the point where it is connected to the spider support of the bundles.

However, during operation, this ring 21 must ensure the guidance of the running part of the extension piece 9, to prevent the latter from experiencing substantial lateral displacements which would risk causing the control bundles to be introduced incorrectly.

The ring 21 also has to perform the function of a flow limiter, to prevent the portion of coolant present in the guide tube 8 from escaping into the space located between the upper plate 13 and the vessel cover 10.

Figure 3:
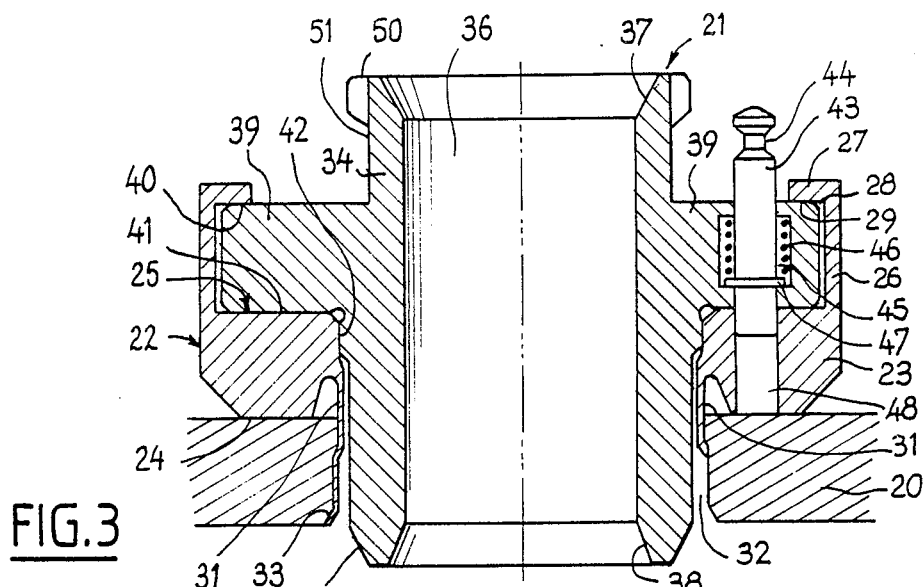
FIG. 3 shows in section the main components of a device according to a first embodiment of the invention.
Figure 4:
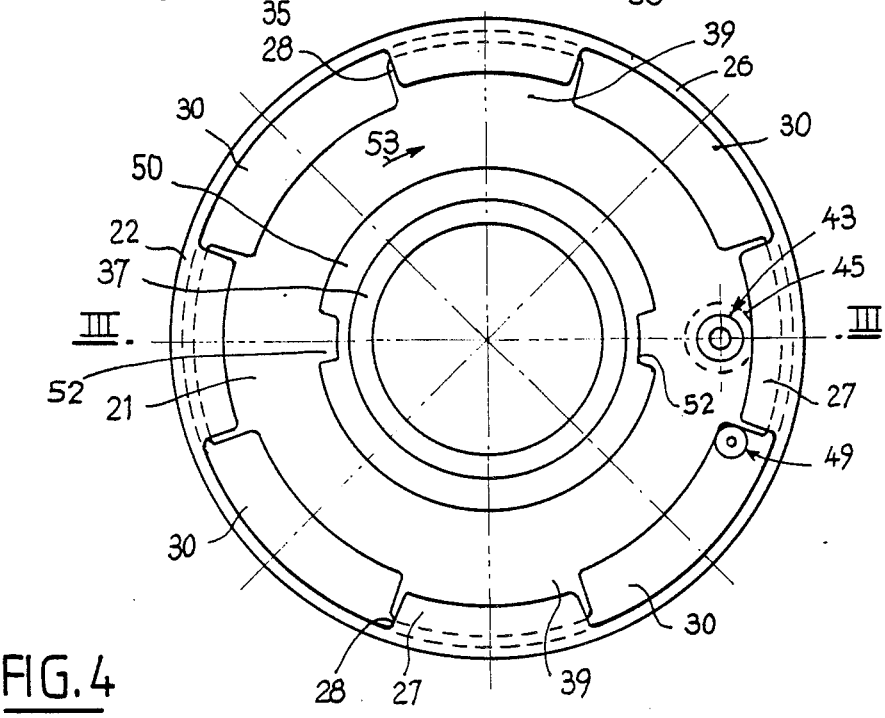
FIG. 4 shows the components of FIG. 3 in a plan view.

As can be seen in FIGS. 3 and 4, according to a preferred embodiment of the invention, a cylindrical intermediate piece 22 has a thick crown 23, the faces 24 and 25 of which define bearing surfaces. In the upper part and on the outer periphery, the crown 23 is extended by a collar 26 provided at its end with a series of shoulders 27 parallel to the bearing surface 25.

Thus, the shoulders 27 form receptacles 28 distributed over the periphery of the intermediate piece 22 and defined by the surfaces 25 of the crown 23, the surface 29 of the shoulder 27 and the inner surface of the collar 26.

Between the shoulders 27, the collar 26 has free edges, thus defining orifices 30.

In its lower part and on its inner periphery, the crown 23 is extended by a cylindrical collar 31 which can be continuous or in the form of sectors.

As shown in the right-hand part of FIG. 3, this collar 31 can have a length equal to or substantially greater than half the thickness of the plate 20 or, as can be seen in the left-hand part of FIG. 3, it can have a length equal to or greater than the thickness of the plate 20.

The collar 31 makes it possible to center the intermediate piece 22 in the orifice 32 made in the center of the plate 20.

As can be seen in FIG. 3, the orifice 32 consists of a bore having different diameters separated by chamfers 33.

In the embodiment described, the intermediate piece 22 is thus centered and thus fastened in the orifice 32 by means of a metallurgical connection which can be, for example, a mechanical rolling tool. The collar 31, deformed in this way, is held rigidly because its outer wall is rammed against the inner wall of the orifice 32 and against the chamfers 33.

The intermediate piece 22 thus constitutes a seat receiving the removable ring 21.

As can be seen in FIGS. 3 and 4, the ring 21 is composed of a cylindrical body 34 which has, in its lower part, a guide chamfer 35 for installing it.

The central orifice 36 in the ring 21 has a diameter slightly greater than the outside diameter of the running part of the extension piece 9 visible in FIG. 1.

This orifice 36 has two guide chamfers 37 and 38 at its ends.

The ring 21 has four lugs or shoulders 39 distributed over the periphery of the cylindrical body 34 and inscribed in a circle of a diameter less than the inside diameter of the collar 26. These lugs 39 have surfaces 40 and 41.

Bosses 42 are arranged under the lugs 39, to allow the ring 21 to be centered in the intermediate piece 22.

FIGS. 3 and 4 illustrate the auxiliary devices for the accurate positioning and blocking of the components. Thus, one of the lugs 39 receives a pin 43, the upper end of which is provided with a groove 44 which makes it possible for a tool (not shown) to take hold of the pin and shift it vertically. A receptacle 45 made in the lug 39 retains a spring 46 arranged concentrically relative to the pin 43. The pin shank has a flange 47, on which bears the end of the spring 46.

A bore of an inside diameter slightly greater than the outside diameter of the pin 43 is made in the crown 23.

Likewise, a stud 49 fitted in an orifice 30 in the immediate vicinity of a shoulder 27 is set in the crown 23. The ring 21 also has, at its upper end, a flange 50 defining a groove 51 which allows a handling tool to grasp it. Notches 52 making it possible for a tool to drive the ring 21 in rotation are made in this flange 50.

To install or extract a guide ring according to FIGS. 3 and 4, the following steps are carried out:

The first operation to be carried out involves installing the intermediate piece 22. This operation takes place during a shutdown of the reactor, when the upper internal equipment is extracted from the vessel 1 and placed on storage stands in the pools of the building containing the reactor.

By means of a tool which is not part of the present invention, the piece 22 is positioned on the plate 20 by inserting the collar 31 into the orifice 32 and as a result of contact between its surface 24 and the upper surface of the plate 20. A second tool then ensures it is fastened by deforming the wall of the collar 31 mechanically against the inner surface of the orifice 32 and against the chamfers 33.

The intermediate piece 22 is then ready to receive the ring 21. It is clear that the piece 22 is only fastened once, that is to say when the previous design is changed. This piece 22 therefore makes it possible to install or extract the rings 21 in a simplified way, as many times as necessary for the operations requiring its removal or replacement.

When it is installed, the ring 21 is grasped by a tool (not shown) by means of the groove 51. The chamfer 37 of the shank 34 makes it possible to couple and center the assembly consisting of the ring and tool.

The piece 21 is introduced into the orifice defined by the collar 31, with the assistance of the chamfer 35, so that the lugs 39 are arranged in line with the orifices 30.

The surfaces 41 of the lugs 39 come in contact with the bearing surface 25 of the crown 23. By means of the notches 52, the tool drives the ring 21 in rotation through an angular displacement of 45°, as represented by the arrow 53 in FIG. 4, until a lug 39 comes up against the stud 49.

This rotation thus ensures that the surfaces 40 of the lugs 39 come into frictional contact with the surfaces 29 of the shoulders 27 and in this way ensures that these components are blocked axially. Preferably, the surfaces 40 are provided with a slope, making it easier for the surfaces 40 and 29 to slide relative to one another and acting in the manner of a wedge.

At the same time, the pin 43 slides on the surface 25, until it is in line with the bore 48 in the crown 23. The pin 43, under the action of the spring 46 acting between the upper wall of the receptacle 45 and the flange 47, is thus introduced into the bore 48, ensuring that the ring 21 is blocked in terms of rotation in the piece 22.

During the removal operations and before the ring 21 is rotated through an angular displacement in the opposite direction, a tool takes hold of the pin 43 by means of its groove 44, in order to extract the pin from the bore 48 by shifting it vertically.

The pin 44 can be equipped with means of blocking it in the upper position.

Figure 5:
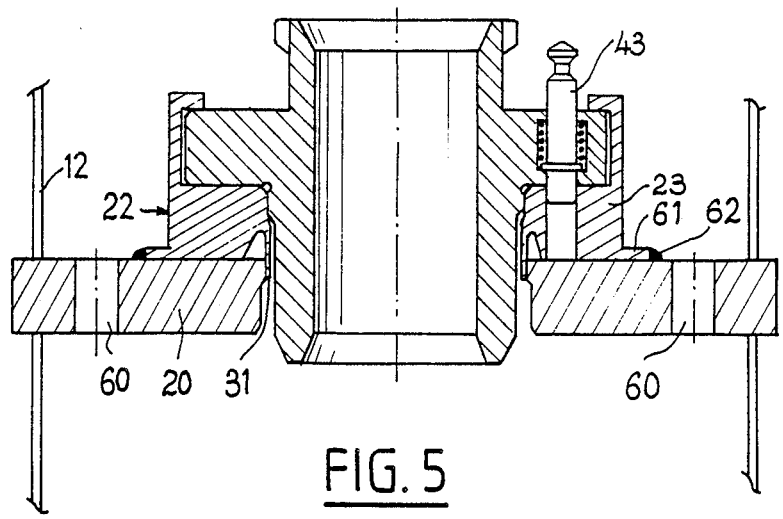
FIG. 5 shows in section the components according to a second embodiment.
Figure 6:
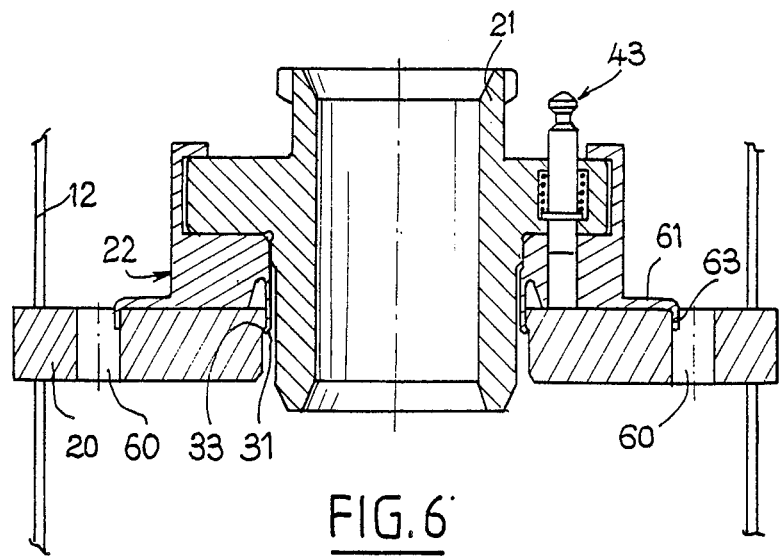
FIG. 6 shows in section the components according to a third embodiment.
Figure 7:
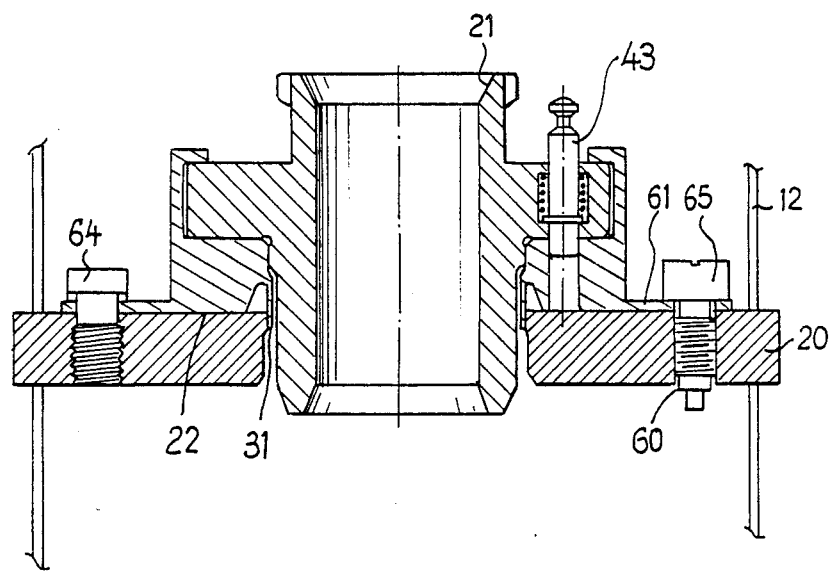
FIG. 7 shows in Section the components according to a fourth embodiment.

The embodiments illustrated in FIGS. 5 to 7, in which the same reference numerals are used, relate to alternative forms of fastening the intermediate plate 22 to the upper plate 20.

These Figures show the walls of the tube 12 and the bores 60 which, in the prior art, are provided as the location of the flexible elements. It is clear that, to put these alternative forms into practice, it is necessary to eliminate these flexible members before the intermediate piece 22 is fastened.

FIG. 5 shows an intermediate piece, in which the crown 23, in the lower part opposite that having the collar 31, is extended in the form of a circular flange 61. This flange is connected to the plate 20 by means of welding. The weld 62 can be made either as a bead or in the form of spots.

FIG. 6 illustrates a flange 61 extending up to the axis of the bores 60. Mechanical deformations 63 are carried out in order to secure the end of the flange 61 against the wall of the bores 60. Light rolling of the collar 31 on the chamfer 33 can be carried out in addition.

FIG. 7 illustrates an alternative form, in which the flange 61 extends beyond the bores 60. Holes of a diameter slightly greater than the diameter of the bores 60 and at the same locations are made in the flange 61, to allow fastening members to pass through.

As can be seen in the left-hand part of the Figure, the fastening member can be a screw 64, whereas, in the right-hand part, the fastening member consists of a radially expanding bush (or jack) 65 of a known type. Where fastening is by means of a screw 64, an operation to tap the bore 60 is carried out after the flexible elements have been removed.

It should be noted that, in all these exemplary embodiments, the collar 31 constitutes the centering element of the intermediate piece 22, thus making it possible to preserve the alignment necessary for the perfect guidance of the control bundles of the reactor.

Figure 8:
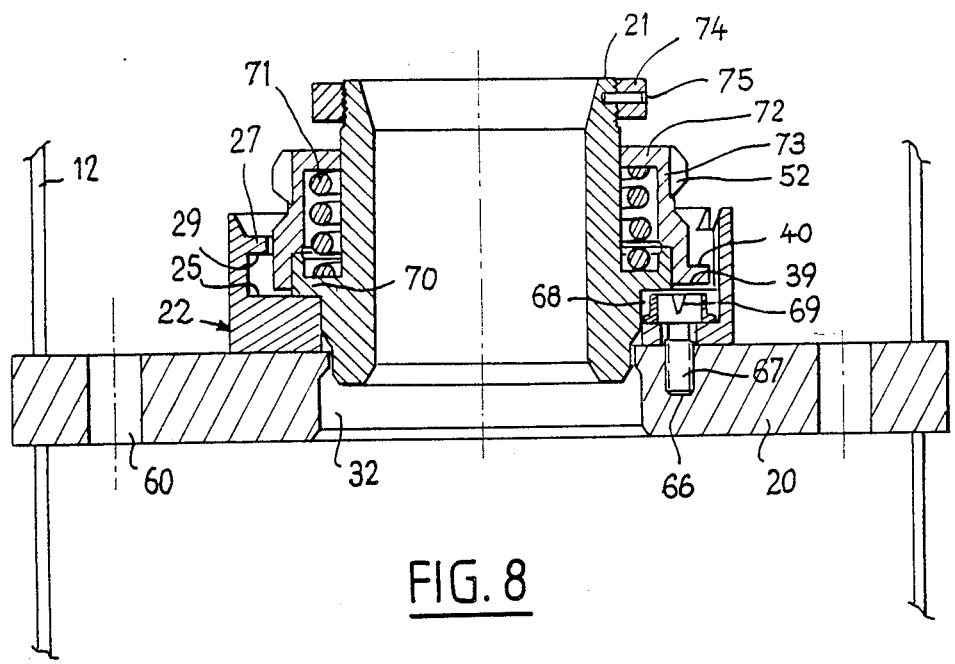
FIG. 8 is a sectional view of a first alternative form of blocking the guide ring in the receptacles of the intermediate piece.
Figure 9:
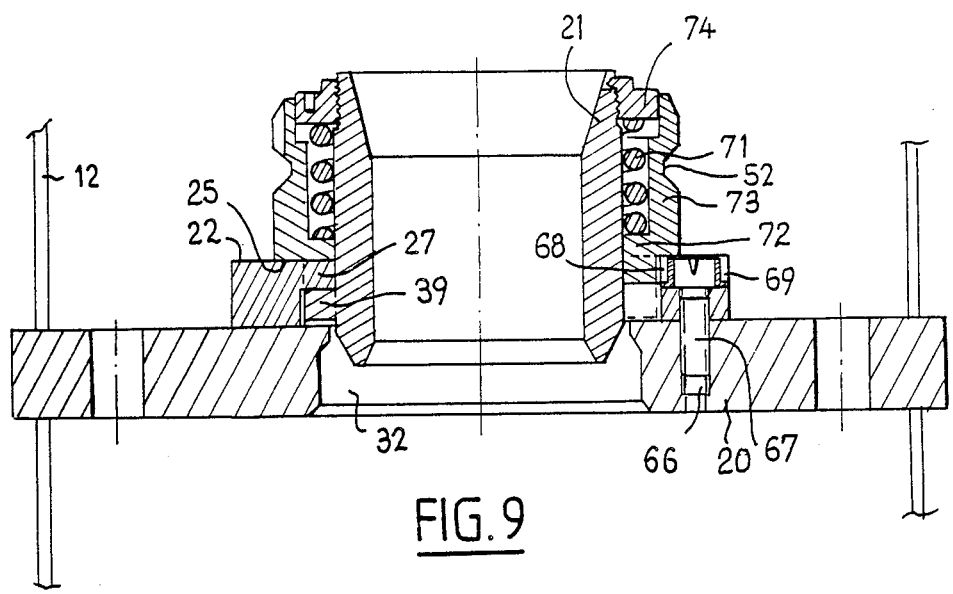
FIG. 9 is a sectional view of a second alternative form of blocking the guide ring in the receptacles of the intermediate piece.

The embodiments which are illustrated in FIGS. 8 and 9 and in which the main reference numerals used in the preceding description are retained relate to alternative forms of blocking the ring 21 axially in the intermediate piece 22.

As can be seen, the piece 22 is fastened to the plate 20 by means of a connection according to the embodiment of FIG. 7, that is to say by means of a screw arrangement.

It will be noted, however, that in these two embodiments the screws 67 are engaged in tapped holes 66, whether opening out onto the lower surface of the plate 20 or not. In both cases, it is expedient to drill the holes 66 by means of a template during the operation of eliminating the flexible elements. This drilling is followed by a tapping operation, to make it possible to attach the piece 22 to the plate 20 by means of the screws 67. The drilling operation by means of a template makes it possible to ensure perfect centering of the pieces 22 and 21 in relation to the central orifice 32 in the plate 20.

The screws 67, which, as can be seen, are arranged in receptacles 68 formed in the bearing surface 25, are provided with a safety system 69 consisting of a ring with a deformable collar preventing the screws 67 from being unscrewed. The depth of the receptacles 68 is calculated so that, when the piece 22 is fastened to the plate 20, the upper part of the head of the screw 67 equipped with the device 69 preventing unscrewing is at a level slightly below the horizontal plane defined by the bearing surface 25. Thus, the heads of the screws 67 cannot constitute an obstacle to the displacement of the lugs 39 of the ring 21 when it is positioned and blocked in the piece 22 as a result of angular displacement.

It should be noted that, in the embodiments described above, an angular displacement of the ring 21 through 45° is necessary to ensure that the lugs 39 are blocked or released in the shoulders 27, because four lugs are used. In the case of FIGS. 8 and 9, three lugs 39 arranged at 120° on the periphery of the ring 21 interact with three shoulders 27, themselves arranged at 120° on the intermediate piece 22. In this case, an angular displacement, indicated by the arrow 53 of FIG. 4, of 60° will be carried out on the ring 21. The angular displacements of the piece 21 therefore depend on the number of lugs and shoulders, these displacements being equal to 360° divided by twice the number of lugs used.

These alternative forms illustrated in FIGS. 8 and 9 relate to auxiliary devices for blocking the removable ring 21 axially in the intermediate piece 22.

As can be seen, these auxiliary devices can increase or replace the axial blocking action by means of a wedge effect resulting from the interaction of the opposing faces 40 and 29 of the lugs 39 and shoulders 27.

Thus, the ring 21 of FIG. 8 has, on its periphery, a shoulder 70 defining a seat for a helical spring 71. An outer ring 72, extended by a vertical cylindrical wall 73 provided with notches 52 for handling the ring 21 and driving it in rotation, forms, together with the shoulder 70, the receptacle for the spring 71. A ring 74 is screwed to the upper end of the ring 21, to limit the displacement of the ring 72. During assembly, the ring 74 receives a welded cotter 75 after the spring 71 and ring 72 have been installed.

During the installation of the ring 21, a handling tool (not shown) brings the shoulder 70 in contact with the bearing surface 25. An angular displacement is then carried out, to make the surfaces 29 and 40 of the shoulders and lugs interact with one another. When the tool is withdrawn, the forces stored by the spring 71 are then released, thus ensuring a considerable ascending contact force between the shoulders and the lugs.

In FIG. 9, the lugs 39 are carried directly by the ring 21, and after the angular displacement the spring 71 exerts a descending force from the outer ring 72 on the intermediate piece 22, causing the vertical axial displacement of the ring 21, thus ensuring that the lugs are blocked axially on the shoulders.

The device according to the invention for locking a removable ring can be used more particularly on the guide tubes of the control and shutdown rods of light-water nuclear reactors.

What is claimed is:

1. A device for locking a guide ring (21) for a follower of a control rod on a plate (20) in a nuclear reactor having an orifice (32), so that the central orifice (36) of the ring (21) is coaxial with the orifice (32) in the plate (20), said device comprising
   (a) a tubular intermediate piece (22) fastened rigidly to the plate (20), so that its central orifice is coaxial with the orifice (32) of the plate (20);
   (b) receptacles (28) machined radially in the intermediate piece (22), arranged on its inner periphery and defining passages (30) open toward an end of the intermediate piece; and
   (c) attachment parts (39) extending from the guide ring (21) on its outer periphery and having a shape corresponding to the shape of the receptacles (28) of the intermediate piece, said attachment parts being received in the receptacles.

2. The locking device as claimed in claim 1, wherein the intermediate piece (22) has a crown (23) bearing on the plate (20) around its orifice (32) and a collar (31) engaged in the orifice (32) of the plate (20) and extending over at least a portion of the height of said orifice and having a radially deformed part ensuring that the intermediate piece (22) is fastened in the orifice of the plate (20).

3. The locking device as claimed in claim 1, wherein the intermediate piece (22) and the guide ring (21) have additional means (43, 48, 49) of stopping the guide ring (21) and fixing it in the attachment position relative to the intermediate piece (22).

4. The device as claimed in claim 1, wherein the plate (20) is an end plate of a guide tube (12) of an extension piece of a control rod of a light-water nuclear reactor, wherein the intermediate piece is centered and fastened on said end plate (20) permanently during a maintenance operation, and wherein said guide ring (21) ensures the guidance of the extension piece (9) and the limitation of the flow of light water in the guide tube (12), and said guide ring (21) can be separated from the intermediate piece (22) simply by being rotated during a subsequent maintenance operation.

5. The locking device as claimed in claim 1, wherein the plate (20) has around the orifice (32), a set of tapped holes (66) made by means of a template and coinciding with a set of screws (67 engaged in receptacles (68) of the intermediate piece (22).

6. The locking device as claimed in claim 5, wherein the receptacles (68) of the screws (67) in the intermediate piece (22) are larger in depth and diameter than heads of screws (67) which are received in said receptacles and have dimensions large enough to house a deformable collar (69) intended to prevent the screw (67) from being unscrewed.

7. The device according as claimed in claim 1, wherein the atachment parts (39) of the guide ring (21) consist of lugs (39) capable of being introduced into the receptacles (28) of the intermediate piece by being inserted axially and rotated about the axis of the ring (21).

8. The locking device as claimed in claim 7, wherein the lugs (39) are machined in the peripheral part of the guide ring (21).

9. The locking device as claimed in claim 7, wherein an outer ring (72) is fitted around the guide ring (21), a spring (71) being inserted between the outer ring (72) and the guide ring (21).

10. The locking device as claimed in claim 7, werein the lugs (39) are machined on a peripheral part of the guide ring 21.

* * * * *